United States Patent [19]

Simpson

[11] Patent Number: 5,143,110

[45] Date of Patent: Sep. 1, 1992

[54] SEISMIC GAS SHUTOFF VALVE

[75] Inventor: Ashton E. Simpson, Hayward, Calif.

[73] Assignee: EMAC, Inc., Hayward, Calif.

[21] Appl. No.: 791,963

[22] Filed: Nov. 12, 1991

[51] Int. Cl.$^5$ .............................................. F16K 17/36
[52] U.S. Cl. ...................................................... 137/38
[58] Field of Search ...................................... 137/38, 39

[56] References Cited

U.S. PATENT DOCUMENTS 3,994,360 11/1976 Leibold ............................. 137/38 X
4,960,145 10/1990 Schlotzhauer ........................ 137/38

Primary Examiner—Robert G. Nilson
Attorney, Agent, or Firm—James J. Leary

[57] ABSTRACT

A shock actuated safety valve which will shut off gas flow in a supply pipe in the event of a major earthquake. The valve housing has a lower chamber having an inlet and an outlet separated by a tapered valve seat. The upper chamber contains the valve actuating mechanism. The piston, which includes a tapered valve gate and a groove with a ridge at the top, is suspended by seven steel balls which rest on the angled floor of the upper chamber and extend partially into the groove so that the ridge rests on the balls. When the valve is subjected to a horizontal acceleration of a predetermined level the balls are dislodged from the groove, releasing the piston so that it falls until the valve gate sealingly engages the valve seat. Also disclosed is a reset mechanism which includes a reset rod which extends through an orifice in the valve cap and is used to lift the piston back to the open position after it has been activated.

8 Claims, 3 Drawing Sheets

CROSS SECTION 3-3

CROSS SECTION 4-4

SEISMIC GAS SHUTOFF VALVE

BACKGROUND OF THE INVENTION

The present invention relates to a shock actuated safety valve which will shut off gas flow in a supply pipe in the event of a major earthquake.

The property damage from a major earthquake can be devastating. Historically, however, much of the worst damage comes after the earthquake is over because of fires that are started during or after the quake. Buildings are especially vulnerable to fire damage at these times because emergency services cannot get through the damaged or rubble-strewn roads to fight the fires. Natural gas supply pipes that are broken or damaged during an earthquake cause a serious danger of fire or explosion. Even a small leak in a gas line can accumulate enough gas in a building to cause a serious explosion if it is ignited.

In the great San Francisco earthquake of Apr. 18, 1906, the actual tremor lasted less than fifteen seconds, but the fires in the aftermath raged out of control for four days, causing more damage than the quake itself. This and similar tragedies point out the importance of having an emergency shutoff valve that will automatically stop the flow of gas into a building when it senses the vibrations of an earthquake of sufficient intensity that it could cause significant structural damage, such as the rupture of gas supply lines.

Recognizing this need, certain regulatory agencies such as the American National Standards Institute (ANSI), and the State Architect of California have established standards of performance for earthquake actuated safety valves. Both the ANSI standard and the California Architectural Code (CAC) require the sensing means of the valve to actuate within 5 seconds when subjected to a horizontal, sinusoidal oscillation having a peak acceleration of 0.3 g (2.94 m/s$^2$) and a period of 0.4 seconds (a frequency of 2.5 Hz). This corresponds to the type of vibrations experienced in an earthquake with a magnitude of 5.4 to 5.6 on the Richter scale.

The standards also require the valve to be insensitive to vibrations that are not typical of seismic activity. For this reason they require that the sensing means not actuate when subjected for five seconds to horizontal sinusoidal oscillation having:

1) peak acceleration of 0.4 g (3.92 m/s$^2$) and a period of 0.1 seconds (a frequency of 10 Hz);
2) peak acceleration of 0.08 g (0.78 m/s$^2$) and a period of 0.4 seconds (a frequency of 2.5 Hz);
3) peak acceleration of 0.08 g (0.78 m/s$^2$) and a period of 0.1 seconds (a frequency of 10 Hz).

This part of the standard is intended to ensure that the shutoff mechanism is not triggered by harmless vibrations such as a passing vehicle, loud noises, or even minor seismic activity that is not likely to result in structural damage or ruptured gas pipes.

It is the intent and objective of the present invention to meet or exceed these standards and thus provide a safety shutoff valve that automatically stops the flow of gas in the occurrence of a major earthquake yet will not unintentionally stop the gas flow when subjected to other harmless vibrations.

It is a further objective of the invention to provide an earthquake sensing mechanism that is omnidirectional in its sensitivity. It is important that the shutoff valve actuate at the correct intensity of oscillations no matter what direction the vibrations are coming from.

It is also an objective to make a shutoff valve that can be easily reset after it has been activated so that gas flow can be reestablished after the danger has passed and the gas pipes have been checked for leaks.

Yet another objective is that the shutoff valve, once it has been activated, should stay closed even if the structural damage to the building is so severe that the valve is tilted 45° from its vertical position.

DISCUSSION OF THE PRIOR ART

U.S. Pat. No. 4,116,209 to Greer discloses a shock actuated shutoff valve that has a tapered cylindrical valve gate suspended on an actuator pin. When a shock of sufficient intensity dislodges the gate from the actuator pin, it falls by gravity into a tapered cylindrical valve seat sealing off fluid flow. The asymmetry of this design makes the valve more sensitive to vibrations from some directions than others. It also lacks a convenient reset mechanism.

U.S. Pat. No. 4,745,939 to Greer, et al., is an improvement on Greer's earlier patent. It has two of the above-described valves aligned so that their actuator pins are at a 45° angle to one another. Each valve also has a tether for resetting the valve by lifting the gate back onto the pin. The redundancy in this design nearly eliminates the directional sensitivity of the earlier valve, but in so doing it doubles the cost and complexity.

U.S. Pat. Nos. 4,485,832 to Plemmons, et al., and 4,565,208 to Ritchie, et al., both disclose valves that have one or more balls riding in a circular track around a central chamber with a valve seat. A seismic shock dislodges one or more of the balls into the central chamber closing the valve. Both have a reset rod for returning the balls to the circular track. The Ritchie patent has the improvement that it has a special ramp-shaped obstruction along the track to urge the balls into the central chamber. These designs have been criticized for being too sensitive and prone to shutting off due to harmless vibrations. Also, the asymmetry of these designs make them more sensitive to vibrations from some directions than others.

U.S. Pat. No. 4,911,029 to Banba, et al., discloses a check valve with an acceleration sensitive triggering mechanism. The triggering mechanism includes a ball which normally rests on a stationary post. When subjected to a horizontal acceleration, the ball moves from the post to strike a reacting cylinder surrounding the post which activates the valve to close. This valve has been criticized as being overly sensitive so that it will shut off due to harmless vibrations. It also lacks any positive means to keep the valve closed if it is tilted 45° from the vertical after it is activated. This requires that the valve be strapped to a wall or other support to prevent tilting which complicates the installation of the valve.

DETAILED DESCRIPTION OF THE INVENTION

Figure 1:
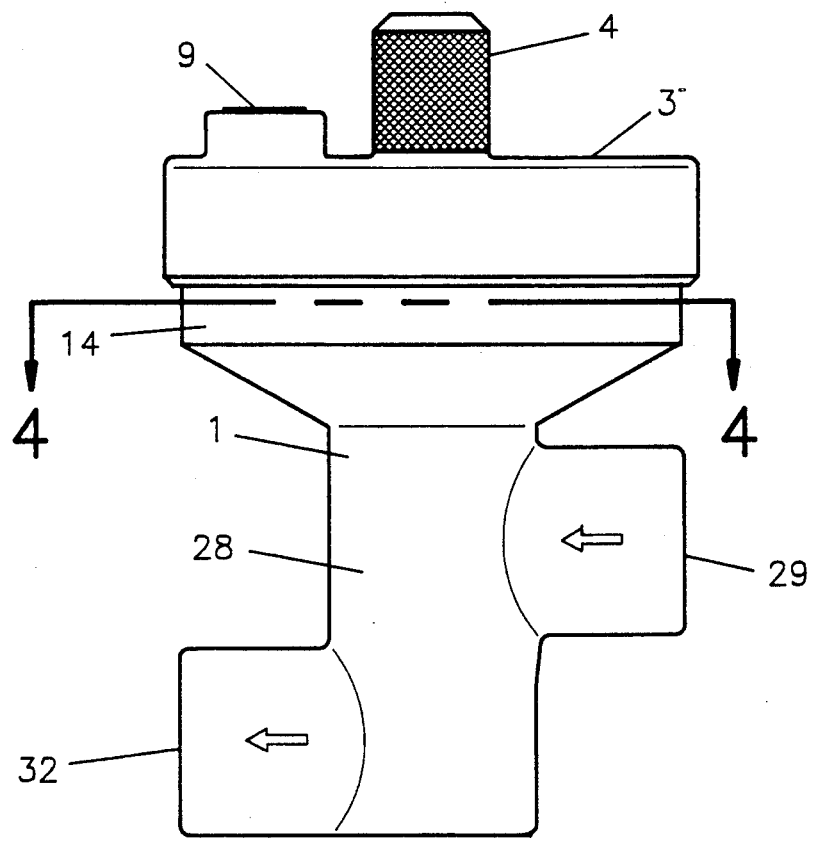
FIG. 1 is a frontal view of the valve.
Figure 2:
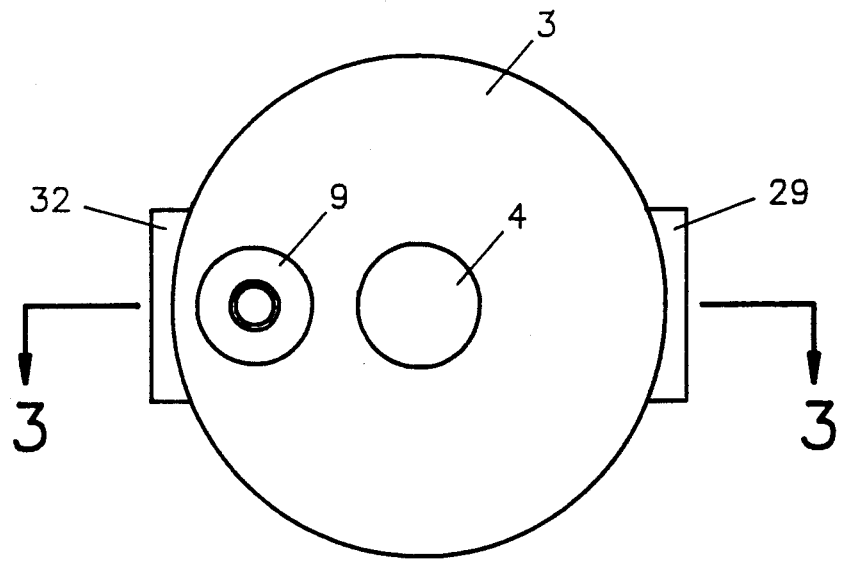
FIG. 2 is a top view of the valve.
Figure 3:
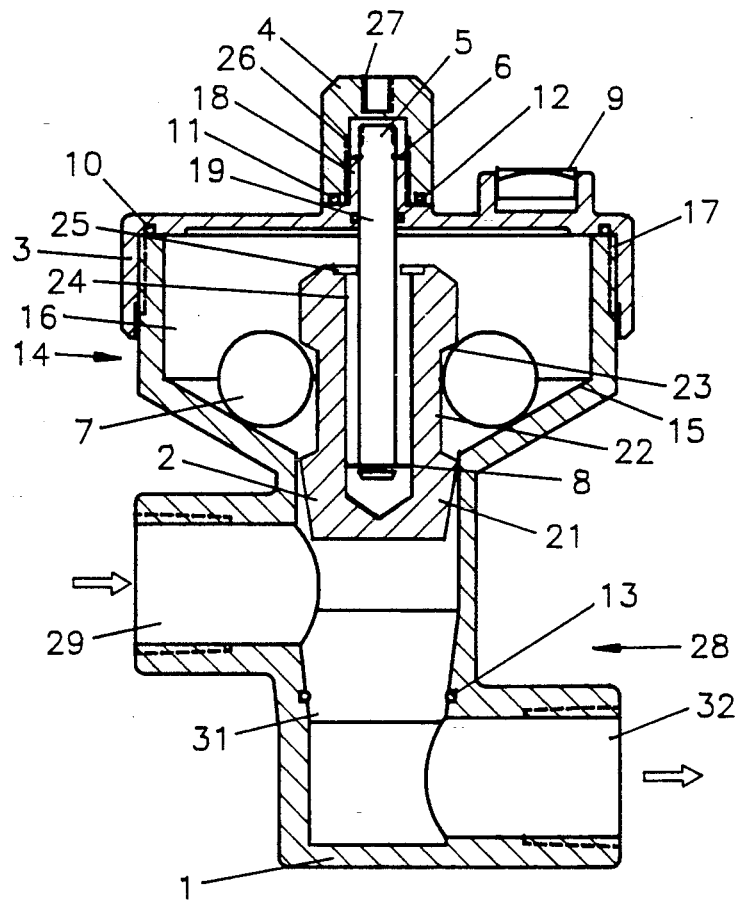
FIG. 3 is a cross-sectional view from the rear of the valve.
Figure 4:
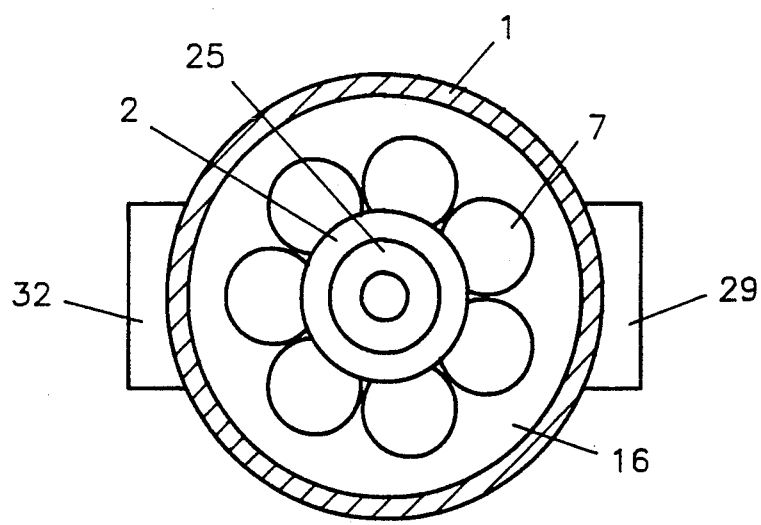
FIG. 4 is a cross-sectional view from the top of the valve.

The following description refers to FIGS. 1 through 4 which show the invention in its presently preferred embodiment. The seismic gas shutoff valve is contained in a valve housing 1. This housing 1 may be made of brass, aluminum, stainless steel, or any suitable material. In the present embodiment it is made of cast and machined brass. The housing 1 includes an upper chamber 14 and a lower chamber 28 which are in communication with one another.

The lower chamber 28 includes an inlet 29 and an outlet 32 connected to the chamber with a valve seat 31 situated between them. The inlet 29 and the outlet 32 may be threaded 33 for connecting to ¾ inch, 1 inch, or other sizes of pipes or other connection means may be provided. The inlet 29 and the outlet 32 may also be made with an external hexagonal shape or other shape to facilitate grasping with a wrench. The lower chamber 28 and the valve seat 31 are preferably of a diameter as large as or larger than the inlet 29 and outlet 32 so that the valve does not impede the flow of gas when it is in the open position. In the preferred embodiment the valve seat 31 is tapered to promote a gas tight seal, the inlet 29 is connected to the lower chamber 28 above the valve seat 31 and the outlet 32 is connected to the lower chamber 28 below the valve seat 31. In this arrangement the fluid pressure tends to assist the valve in closing and staying closed after it is actuated. It also allows the use of an O-ring seal 13 in the valve seat 31 which further increases the pressure sealing ability of the valve.

Alternatively, the inlet 29 and the outlet 32 may connect to the lower chamber 28 at the same level with the valve seat 31 located between them. In this embodiment, the taper on the valve seat 31 must very closely match the taper on the valve gate 21 to effect a positive seal. A conformal coating, such as polytetrafluoroethylene, on the valve seat 31 or the valve gate 21 can improve the sealing ability of the valve in this configuration.

The upper chamber 14 contains the valve actuating mechanism. The floor of the chamber 15 is angled downwardly and inwardly toward the center. At the center of the chamber is the piston 2 which is surrounded by an annular space 16. The piston 2 is generally in the shape of a hollow cylinder which is closed at the bottom. It has three sections of differing diameter. The lower section makes up a valve gate 21 which preferably matches the valve seat 31 in diameter and taper so that it will effect a seal when the valve gate 21 is positioned in the valve seat 31. Above the valve gate 21 on the piston 2 is the groove 22, a section of reduced diameter which separates the valve gate 21 from the ridge 23. In the preferred embodiment the groove 22 is trapezoidal in shape with the ridge 23 at the top of the groove 22 parallel to the angled floor 15 of the chamber as illustrated. The valve has also been found to be effective if the groove 22 is semicircular in shape with the ridge 23 integral with the top of the arc.

When the valve is in the open position, the piston 2 is held in the upper chamber 14 by a plurality of balls 7 that surround the piston 2 extending partially into the groove 22 so that the ridge 23 rests on the balls 7. In the present embodiment, the actuating mechanism contains seven ⅜ inch steel balls 7. However, with minor changes in the geometry, the valve could be made to be effective with more or fewer balls 7.

Covering the upper chamber 14 is a cap 3 which forms a gas tight seal. The cap 3 may be threaded 17 onto the housing or held on by other means. An O-ring seal 10 may be used to maintain the gas tight seal. The cap 3 preferably includes a tamper resistant means to prevent unauthorized tampering with the valve. In the present embodiment, the cap 3 is threaded onto the housing with a left hand thread 17 as a tamper resistant means. Alternatively, other tamper resistant means may be used such as a wire seal or tamper resistant fasteners.

The cap 3 also contains the reset mechanism for the valve. The cap 3 has an orifice 19 in the center through which passes the reset rod 5. An O-ring 12 makes a gas tight seal between the orifice 19 and the reset rod 5. The reset rod 5 then passes through a retaining washer 25 into the hollow center 24 of the piston 2. The retaining washer 25 is held into the top of the piston 2 by a crimp or another fastening means. An E ring 8 attached to the lower end of the reset rod 5 prevents it from passing through the retaining washer 25 so that it can be used to lift the piston 2 into place. The upper end of the reset rod 5 also has a snap ring 6 to prevent the rod 5 from being pushed all the way through the orifice 19.

In the preferred embodiment, the upper end of the reset rod 5 is threaded for attachment of a reset knob 4. The reset knob 4 has female threads 27 on one side for attachment to the reset rod 5 and larger female threads 26 on the opposite side so that it can be turned over and used to cover the reset rod 5 by screwing onto a threaded extension 18 around the orifice 19 of the cap 3. In this position, the reset knob 4 serves to discourage unauthorized tampering with the reset mechanism and also serves as a secondary seal to guard against gas leaks because of the O-ring 11 provided in the knob 4. In the preferred embodiment, the cap 3 also includes a bubble level 9 which is used to ensure that the valve is in a vertical position when it is installed.

Figure 5:
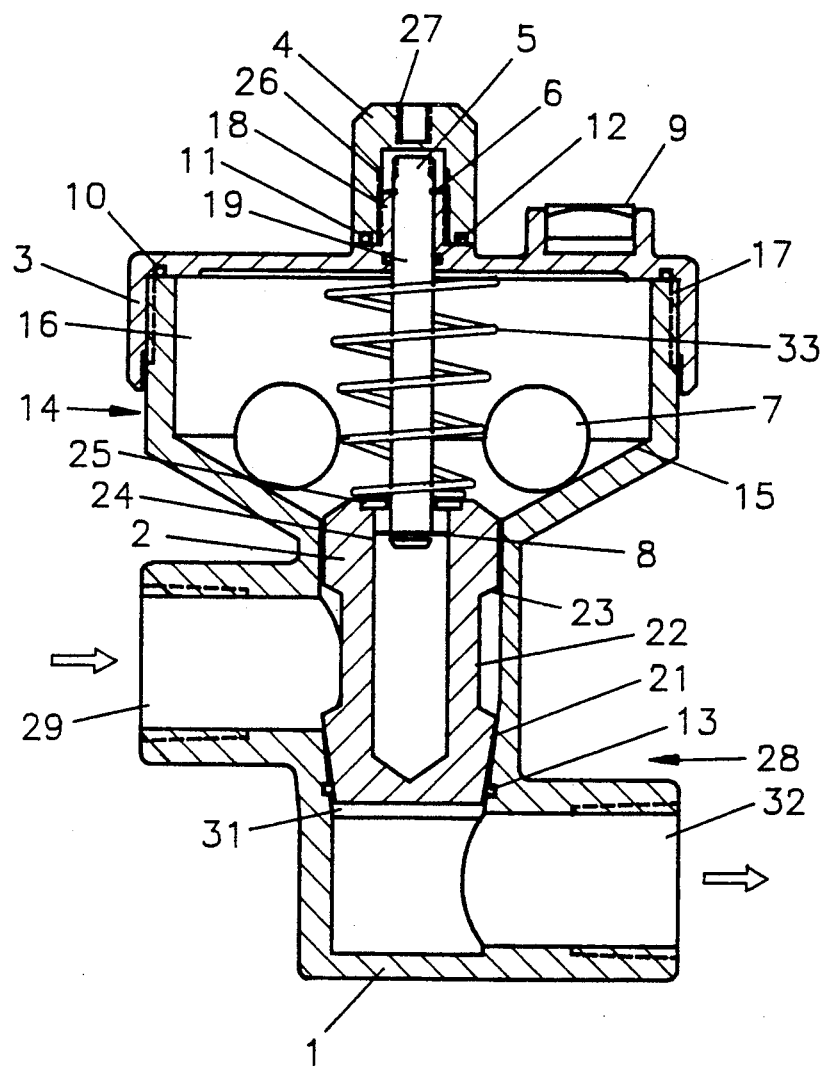
FIG. 5 shows a cross section of an alternate embodiment of the valve.

FIG. 5 is a cross-sectional view of an alternate embodiment of the present invention showing the valve in the closed position. In this embodiment, the valve actuating mechanism also includes a spring 33 which provides additional force to urge the piston 2 into a position where the valve gate 21 sealingly engages the valve seat 31.

OPERATION OF THE SEISMIC GAS SHUTOFF VALVE

The valve is installed in a natural gas supply pipe or other fluid conduit upstream of the building, appliance or process that is to be protected. The bubble level 9 is used to be sure that the valve is in a vertical position when it is installed. The inlet 29 is connected to the supply pipe and the outlet 32 is connected to the pipe leading into the building. Then the valve must be set to the open position.

To set the valve, the reset knob 4 is unscrewed from the cap 3, turned over, and threaded onto the reset rod 5. The reset rod 5 is pulled upward to its full extent. In doing so, the reset rod 5 has lifted the piston 2 into the open position in the upper chamber 14. The angled floor 15 of the upper chamber 14 causes the balls 7 to roll toward the center and into the groove 22 of the piston 2. The reset rod 5 is then pushed downward until it stops, leaving the ridge 23 of the piston 2 resting on the balls 7 holding the valve gate 21 suspended above the valve seat 31. The reset knob 4 should then be unscrewed from the reset rod 5, turned over, and screwed back onto the cap 3.

The piston 2 is held in place by the balls 7, which are in turn held in place by the component of their weight which acts along the incline of the angled floor 15 to hold the balls 7 in the groove 22, combined with the friction between the balls 7 and the ridge 23 from the weight of the piston 2. The valve remains stable in this position until it is subjected to a horizontal acceleration.

When the valve is subjected to a horizontal acceleration such as that experienced during the horizontal oscillations of an earthquake, the balls 7 act as an inertial reactive mass. The reactive force due to the acceleration has a component which tends to push the balls 7 up the incline of the angled chamber floor 15. When the oscillations reach a great enough acceleration and amplitude, the component of the reactive force of the balls 7 along the incline 15 will overcome the component of the gravitational force along the incline 15 and the friction which tend to hold the balls 7 in place, and the balls 7 will roll up the incline 16, out of the groove 22 and into the annular space 16 which surrounds the piston 2. This releases the piston 2 which falls by gravity from the upper chamber 14 into the lower chamber 28 until the valve gate 21 sealingly engages the valve seat 31, thereby stopping the flow of gas. Due to the geometry of the valve, the piston 2 remains in this position and the valve remains closed even if the structural damage to the building during the earthquake was great enough to tilt the valve to 45 degrees from the vertical.

SUMMARY, RAMIFICATIONS AND SCOPE

It should be apparent from the above description that the sensitivity of the actuating mechanism to lateral accelerations can be affected by a number of factors, the most important of which is the angle of the upper chamber floor. It has been found that the valve best meets the current ANSI and CAC sensitivity specifications when the angle of the floor of the upper chamber is approximately 29° from the horizontal and the angle of the ridge above the groove is parallel to it. The valve can be made more sensitive to vibrations by lowering the angle and less sensitive by raising the angle. Thus, the sensitivity of the actuating mechanism to vibrations can be tuned for different applications or to meet different performance specifications if they are ever changed in the future by the governing agencies.

The innate symmetry of its design makes the actuating mechanism equally sensitive to vibrations coming from any direction. This makes the seismic gas shutoff valve truly omnidirectional, eliminating the need for redundant valves for multidirectional sensitivity. This not only makes the valve better functionally, but it also makes it simpler and less expensive to manufacture.

The fact that this valve is gravity driven frees the valve from dependence on external power sources or stored energy, which may be rendered nonoperational by an earthquake, to close the valve. In some applications where gravity is not sufficient to close the valve, additional closing force can be provided by a spring or hydraulic or pneumatic force.

This valve is specifically designed to shut off the flow of natural gas into a building in the even of a major earthquake. However, the valve might also be used for a number of other applications, with or without modification, to shut off the flow of a fluid in the event of a predetermined level of shock or oscillation. For instance, the valve may be used to shut off the flow of water into a building or it may be used to shut off the flow of fluids or gases in an industrial process in the event of an earthquake, explosion or other shock.

The valve, used as an earthquake or shock detector, may be incorporated into a larger system to shut off a multitude of services. The valve, for instance, could be used to generate a pneumatic or electrical signal to a system which would shut off any or all of the following services: natural gas supply, water supply, electricity, gas or fluid flow or power to industrial processes. Such a system could even be used to turn on emergency services such as warning lights or sirens or backup power from batteries or a generator in case of an earthquake.

Although the preceding description and the accompanying drawings contain many specifics, these should not be construed as limiting the scope of the invention but merely as illustrations of the presently preferred embodiments of this invention. Many variations are possible within the scope of the invention. Thus the scope of the invention should be determined by the appended claims and their legal equivalents rather than by the examples given.

I claim:

1. A seismic shutoff valve comprising:
   a housing having a lower chamber and an upper chamber in communication with one another, said lower chamber having an inlet and an outlet separated by a valve seat, said upper chamber having a floor which is angled downwardly and inwardly.
   an actuating mechanism comprising a piston, having a valve gate and a ridge which are separated by a groove, and a plurality of balls disposed within said upper chamber,
   said piston being held suspended above said valve seat by said balls which rest on said floor, extending partially into said groove, with said ridge resting on said balls,
   until the valve is subjected to a horizontal acceleration which dislodges said balls from said groove, thereby releasing said piston which drops into a position where said valve gate sealingly engages said valve seat.

2. The seismic shutoff valve of claim 1 further comprising a spring means which urges said piston into a position where said valve gate sealingly engages said valve seat.

3. The seismic shutoff valve of claim 1 wherein said valve seat and said valve gate are tapered to promote a gas tight seal.

4. The seismic shutoff valve of claim 3 wherein said valve seat further comprises an O-ring seal.

5. The seismic shutoff valve of claim 1 comprising seven of said balls.

6. The seismic shutoff valve of claim 1 further comprising a reset mechanism.

7. The seismic shutoff valve of claim 6 wherein said reset mechanism comprises a reset rod adapted to lift said piston to a position where said valve gate is suspended above said valve seat.

8. A seismic shutoff valve comprising:
   a housing having a lower chamber and an upper chamber in communication with one another, said lower chamber having an inlet and an outlet separated by a valve seat, said upper chamber having a floor which is angled downwardly and inwardly at an angle of approximately 29 degrees from the horizontal, an actuating mechanism comprising a piston, having a valve gate and a ridge which are separated by a groove, and a plurality of balls disposed within said upper chamber, said piston being held suspended above said valve seat by said balls which rest on said floor, extending partially into said groove, with said ridge resting on said balls, until the valve is subjected to a horizontal acceleration which dislodges said balls from said groove, thereby releasing said piston which drops into a position where said valve gate sealingly engages said valve seat, and a reset mechanism which comprises a reset rod adapted to lift said piston back to the position where said valve gate is suspended above said valve seat.

* * * * *